US010733522B2

(12) United States Patent
Curtis et al.

(10) Patent No.: US 10,733,522 B2
(45) Date of Patent: Aug. 4, 2020

(54) GENERATING QUANTUM LOGIC CONTROL SEQUENCES FOR QUANTUM INFORMATION PROCESSING HARDWARE

(71) Applicant: Rigetti & Co, Inc., Berkeley, CA (US)

(72) Inventors: Michael J. Curtis, Sacramento, CA (US); William J. Zeng, Berkeley, CA (US); Eyob A. Sete, Walnut Creek, CA (US)

(73) Assignee: Rigetti & Co, Inc., Berkeley, CA (US)

( * ) Notice: Subject to any disclaimer, the term of this patent is extended or adjusted under 35 U.S.C. 154(b) by 0 days.

(21) Appl. No.: 16/375,990

(22) Filed: Apr. 5, 2019

(65) Prior Publication Data
US 2019/0370679 A1    Dec. 5, 2019

Related U.S. Application Data

(63) Continuation of application No. 15/348,226, filed on Nov. 10, 2016, now Pat. No. 10,255,555.

(51) Int. Cl.
*G06N 10/00* (2019.01)
*G06F 16/901* (2019.01)
(Continued)

(52) U.S. Cl.
CPC ......... *G06N 10/00* (2019.01); *G06F 16/9024* (2019.01); *G06N 5/022* (2013.01); *B82Y 10/00* (2013.01)

(58) Field of Classification Search
CPC ..... G06N 99/002; B82Y 10/00; H03K 19/195
(Continued)

(56) References Cited

U.S. PATENT DOCUMENTS 7,778,951 B2 *  8/2010  Gilbert .................. G06N 10/00
                                                              706/45
8,244,662 B2     8/2012  Coury et al.
                         (Continued)

FOREIGN PATENT DOCUMENTS

WO    20120074752      6/2012
WO    2015178990 A2    11/2015
WO    2018089792       5/2018

OTHER PUBLICATIONS

KIPO, International Search Report and Written Opinion dated Mar. 16, 2018, in PCT/US2017/061102, 14 pgs.
(Continued)

*Primary Examiner* — Jonathan Han
(74) *Attorney, Agent, or Firm* — Henry Patent Law Firm PLLC

(57) ABSTRACT

In a general aspect, a quantum logic control sequence is generated for a quantum information processor. In some aspects, a quantum computation to be performed by a quantum information processor is identified. The quantum information processor includes data qubits and is configured to apply entangling quantum logic operations to respective pairs of the data qubits. A graph representing the quantum information processor is defined. The graph includes vertices and edges; the vertices represent the data qubits, and the edges represent the entangling quantum logic operations. A quantum logic control sequence is generated based on the graph. The quantum logic control sequence includes a sequence of quantum logic operations configured to perform the quantum computation when executed by the quantum information processor.

33 Claims, 8 Drawing Sheets

(51) Int. Cl.
  *G06N 5/02* (2006.01)
  *B82Y 10/00* (2011.01)
(58) Field of Classification Search
  USPC .................................................. 706/45, 62
  See application file for complete search history.

(56) References Cited

U.S. PATENT DOCUMENTS

| | | | |
|---|---|---|---|
| 10,255,555 B2 | 4/2019 | Curtis et al. | |
| 2003/0121028 A1 | 6/2003 | Coury et al. | |
| 2005/0131746 A1† | 6/2005 | Beausoleil et al. | |
| 2005/0224784 A1† | 10/2005 | Amin et al. | |
| 2007/0239366 A1* | 10/2007 | Hilton | B82Y 10/00 702/27 |
| 2009/0121215 A1* | 5/2009 | Choi | B82Y 10/00 257/31 |
| 2009/0259905 A1† | 10/2009 | Silva et al. | |
| 2011/0047201 A1 | 2/2011 | Macready et al. | |
| 2015/0032994 A1 | 1/2015 | Chudak et al. | |
| 2016/0267032 A1* | 9/2016 | Rigetti | G06F 13/36 |
| 2016/0283857 A1† | 9/2016 | Babbush et al. | |
| 2017/0024913 A1* | 1/2017 | Greene | G06T 11/206 |

OTHER PUBLICATIONS

Nielsen, Michael A., et al., "The Fermionic canonical commutation relations and the Jordan-Wigner transform", Jul. 29, 2005, 8 pages.
Seeley, Jacob T., et al., "The Bravyi-Kitaev transformation for quantum computation of electronic structure", arXiv:1208.5986v1 [quant-ph], Aug. 30, 2012, 39 pages.
Smith, Robert S, et al., "A Practical Quantum Instruction Set Architecture", arXiv:1608.03355v1 [quant-ph], Aug. 11, 2016, 14 pages.
Whitfield, James D., et al., "Simulation of Electronic Structure Hamiltonians Using Quantum Computers", arXiv:1001.3855v3 [quant-ph], Dec. 19, 2010, 22 pages.

\* cited by examiner
† cited by third party

US 10,733,522 B2

GENERATING QUANTUM LOGIC CONTROL SEQUENCES FOR QUANTUM INFORMATION PROCESSING HARDWARE

CROSS-REFERENCE TO RELATED APPLICATIONS

This application is a continuation of U.S. patent application Ser. No. 15/348,226, filed Nov. 10, 2016, and entitled "Generating Quantum Logic Control Sequences for Quantum Information Processing Hardware," the disclosure of which is hereby incorporated by reference.

BACKGROUND

The following description relates to generating quantum logic control sequences for quantum information processing hardware.

Quantum computers can perform computational tasks by executing quantum algorithms. Quantum algorithms are often expressed in terms of quantum logic operations applied to qubits. A variety of physical systems have been proposed as quantum computing systems. Examples include superconducting circuits, trapped ions, spin systems and others.

DETAILED DESCRIPTION

In some aspects of what is described here, a quantum logic control sequence is generated for performing a quantum computation. The quantum logic control sequence can be generated based on the attributes of the quantum information processor that will execute the quantum logic control sequence. For instance, the quantum logic control sequence can be generated based on the specific qubit-qubit connectivity in the quantum information processor hardware. In some cases, the qubit-qubit connectivity in the quantum information processor can be represented in a graph, and the graph can be used to generate the quantum logic control sequence for a quantum computation to be executed.

In some examples, the quantum computation can include a simulation of a quantum system. For instance, a quantum logic gate sequence can be executed to perform an efficient simulation of fermions on a gate-based quantum information processor. In some cases, construction of quantum logic circuits for arbitrary fermionic Hamiltonians can be optimized or otherwise improved based on the qubit-qubit connectivity of the quantum information processor that will execute the simulation.

In some implementations, a quantum logic circuit can be constructed to perform a quantum computation with fewer quantum logic gates. In some instances, a quantum logic circuit with fewer quantum logic gates can provide practical advantages; for example, the quantum logic circuit may be executed in less time, with less error correction, with greater accuracy or a combination of these and other advantages. For instance, a quantum information processor may have a limited per-gate fidelity, so fewer gates may translate to more accurate calculations and potentially unlock larger problems.

In some implementations, the quantum logic circuit can be constructed to reduce overhead, for example, by reducing the need for routing information through the quantum information processor. For instance, a quantum information processors may have fixed connectivity, and adapting the quantum logic circuit to the connectivity of the quantum information processor may reduce the need to transfer information to connected qubits. For example, a two-dimensional lattice of qubit devices with nearest-neighbor connectivity may have each qubit device connected to four other qubit devices, and a three-dimensional lattice of qubit devices with nearest-neighbor connectivity may have each qubit device connected to six other qubit devices; a transformation procedure that accounts for such qubit connectivity may provide more efficient quantum computations.

Figure 1:
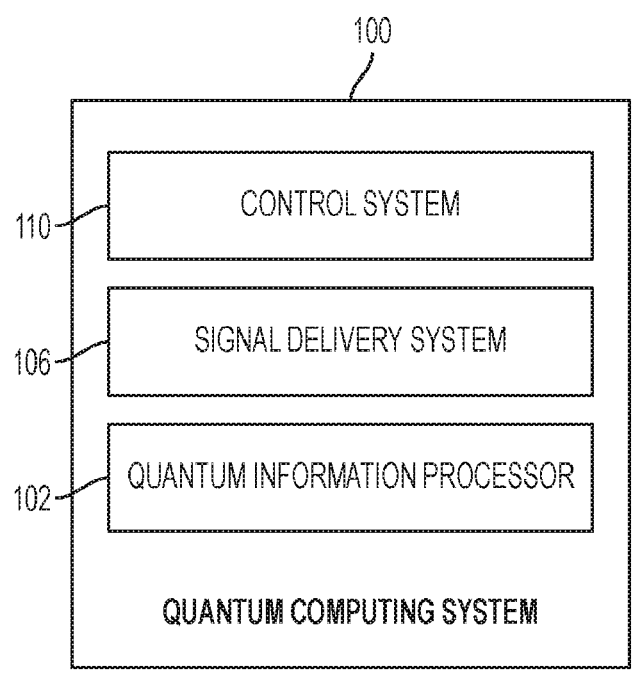
FIG. 1 is a bock diagram of an example quantum computing system.

FIG. 1 is a schematic diagram of an example quantum computing system 100. The example quantum computing system 100 shown in FIG. 1 includes a control system 110, a signal delivery system 106, and a quantum information processor 102. A quantum computing system may include additional or different features, and the components of a quantum computing system may operate as described with respect to FIG. 1 or in another manner.

The example quantum computing system 100 shown in FIG. 1 can perform quantum computational tasks by executing quantum algorithms. In some implementations, the quantum computing system 100 can perform quantum computation by storing and manipulating information within individual quantum states of a composite quantum system. For example, qubits (i.e., quantum bits) can be stored in and represented by an effective two-level sub-manifold of a quantum coherent physical system. Control devices (e.g., coupler devices) can be used to perform quantum logic operations on single qubits or conditional quantum logic operations on multiple qubits. In some instances, the conditional quantum logic can be performed in a manner that allows large-scale entanglement within the quantum computing device. Control signals can manipulate the quantum states of individual qubits and the joint states of multiple qubits. In some instances, information can be read out from the composite quantum system by measuring the quantum states of the individual qubits.

In some implementations, the quantum computing system 100 can operate using gate-based models for quantum computing. For example, topological quantum error correction schemes can operate on a lattice of nearest-neighbor-coupled qubits. In some instances, these and other types of quantum error correcting schemes can be adapted for a two- or three-dimensional lattice of nearest-neighbor-coupled qubits, for example, to achieve fault-tolerant quantum computation. The lattice can allow each qubit to be independently controlled and measured in some cases. Adjacent pairs of qubits in the lattice can be addressed, for example, with two-qubit gate operations that are capable of generating entanglement, independent of other pairs in the lattice.

In some implementations, the quantum computing system 100 can operate using adiabatic models for quantum computing. For instance, the qubits can be initialized in an initial state, and the controlling Hamiltonian can be transformed adiabatically by adjusting control parameters to another state that can be measured to obtain an output of the quantum computation.

In some implementations, the quantum computing system 100 is constructed and operated according to a scalable quantum computing architecture. For example, in some cases, the architecture can be scaled to a large number of qubits to achieve large-scale general purpose coherent quantum computing.

The example quantum information processor 102 shown in FIG. 1 includes qubit devices that are used to store and process quantum information. The quantum information processor 102 shown in FIG. 1 can be implemented, for example, as the quantum information processor 200 shown in FIG. 2 or in another manner. In some cases, the quantum information processor 102 includes a superconducting circuit, and the qubit devices are implemented as circuit devices that include superconducting quantum interference device (SQUID) loops. In some cases, the quantum information processor 102 includes an ion trap system, and the qubit devices are implemented as trapped ions.

In the example quantum information processor 102, the qubit devices each store a single qubit (a bit of quantum information), and the data qubits can collectively define a computational state for a quantum computation. The quantum information processor 102 may also include readout devices that interact with the qubit devices to detect their quantum states. For example, the readout devices may generate readout signals that indicate the computational state. The quantum information processor 102 may also include coupler devices that selectively operate on individual qubits or pairs of qubits. For example, the coupler devices may be operated to produce entanglement over two or more qubits in the quantum information processor 102.

In some implementations, the example quantum information processor 102 can process the quantum information stored in the data qubits by applying control signals to the qubit devices or to other control devices in the quantum information processor 102. In some examples, the operations can be expressed as single-qubit gates, two-qubit gates, or other types of logical gates that operate on one or more qubits. A sequence of quantum logic operations can be applied to the qubits to perform a quantum computation. The quantum computation may correspond to a quantum simulation or another type of quantum algorithm.

In the example quantum computing system 100 shown in FIG. 1, the control system 110 controls operation of the quantum information processor 102. The example control system 110 may include data processors, signal generators, interface components and other types of systems or subsystems. In some cases, the control system 110 includes one or more classical computers or classical computing components.

In some implementations, the control system 110 generates a quantum logic control sequence based on a quantum computation to be performed. The quantum logic control sequence can include a sequence of quantum logic operations that can be executed by the quantum information processor 102. In some cases, the control system 110 generates a quantum logic control sequence according to the example process 300 shown in FIG. 3. For example, the control system 110 may include one or more classical computers configured to perform one or more of the operations in the example process 300. The quantum logic control sequence may then be converted to control signals (e.g., microwave control signals, optical control signals, DC bias control signals, etc.) that are delivered to the quantum information processor 102, and upon delivery, cause the quantum information processor 102 to execute the quantum computation.

In the example shown in FIG. 1, the signal delivery system 106 provides communication between the control system 110 and the quantum information processor 102. For example, the signal delivery system 106 can receive control signals (e.g., qubit control signals, readout control signals, coupler control signals, etc.) from the control system 110 and deliver the control signals to the quantum information processor 102. In some instances, the signal delivery system 106 performs preprocessing, signal conditioning, or other operations to the control signals before delivering them to the quantum information processor 102.

The signal delivery system 106 may include signal lines, signal processing hardware, filters, feedthrough devices, or a combination of these and other types of components. In some implementations, the signal delivery system 106 provides connections between different temperature and noise regimes. For example, the quantum computing system 100 may include a series of temperature stages between a higher temperature regime of the control system 110 and a lower temperature regime of the quantum information processor 102.

The quantum information processor 102, and in some cases all or part of the signal delivery system 106, can be maintained in a controlled environment. The environment can be provided, for example, by shielding equipment, cryogenic equipment, and other types of environmental control systems. In some examples, the components in the quantum information processor 102 operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

Figure 2:
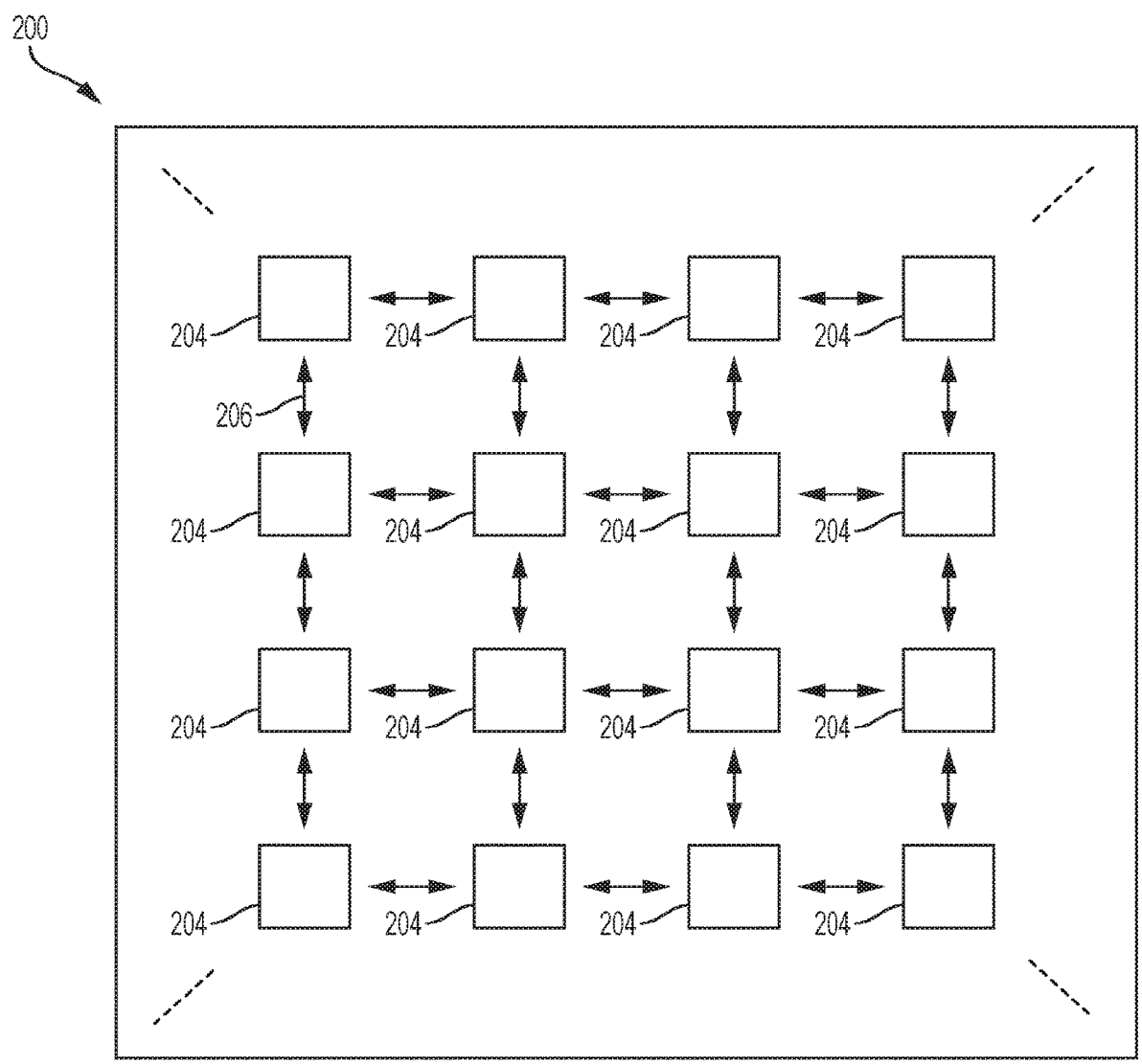
FIG. 2 is a block diagram on an example quantum information processor.

FIG. 2 is a block diagram showing an example quantum information processor 200. The example quantum information processor 200 includes a two-dimensional device array, which includes qubit devices 204 arranged in a lattice structure. Sixteen qubit devices are shown in FIG. 2. The example quantum information processor 200 may include additional devices; for example, the lattice structure may include additional rows or columns of qubit devices, coupler devices arranged between neighboring pairs of the qubit devices, readout devices arranged in proximity to the qubit devices, or a combination of these.

In the example shown in FIG. 2, the qubit devices 204 are arranged in a rectilinear (e.g., rectangular or square) array that extends in two spatial dimensions (in the plane of the page), and each qubit device 204 has four nearest-neighbor qubit devices. In some implementations, the qubit devices 204 can be arranged in another type of ordered array. In some instances, the rectilinear array also extends in a third spatial dimension (in/out of the page), for example, to form a cubic array or another type of three-dimensional array. The quantum information processor 200 may include additional devices, including additional qubit devices, coupler devices and other types of devices.

The example quantum information processor 200 is configured to apply entangling quantum logic operations 206 to neighboring pairs of the qubit devices 204. In some cases, the entangling quantum logic operations 206 are quantum logic gates that can be applied to two target qubits to produce an entangled state on the target qubits. An example of a quantum logic gate is a controlled-not (CNOT) gate; the quantum information processor 200 may be configured to apply other types of entangling quantum logic operations.

In some implementations, the entangling quantum logic operations 206 are applied by operating a coupler device between the neighboring pair of qubit devices 204. In some cases, quantum information processor 200 can be implemented as a superconducting circuit, qubit devices 204 may be implemented as circuit devices that include superconducting quantum interference device (SQUID) loops, and each coupler device may include a SQUID loop whose resonance frequency determines a coupling strength between neighboring qubit devices. For instance, the qubit devices may be implemented as transmon devices, and the entangling quantum logic operations 206 may be applied by operating fluxonium devices coupled to respective pairs of transmon devices. The superconducting circuit devices (e.g., transmon devices and fluxonium devices) may be operated by microwave signals delivered in the quantum information processor 200, for example, from a control system. The entangling quantum logic operations 206 may be applied by operating by other types of components.

The example entangling quantum logic operations 206 shown in FIG. 2 can be applied directly to pairs of data qubits encoded in neighboring qubit devices 204. In some cases, the entangling quantum logic operations 206 are enabled by the low-level structure of the quantum information processor hardware, and can be applied directly in hardware, without routing information or recomposing in terms of other quantum logic operations.

In the example shown in FIG. 2, the qubit devices 204 can each be encoded with a single bit of quantum information. Each of the qubit devices has two eigenstates used as computational basis states ("0" and "1"), and each qubit device can transition between its computational basis states or exist in an arbitrary superposition of its basis states. In some implementations, connections between the qubit devices 204 in the quantum information processor 200 allow the qubits to be selectively coupled on-demand, for instance, to entangle neighboring pairs of qubits or to perform other types of operations.

In some instances, information is encoded in the qubit devices 204, and the information can be processed by applying a quantum logic control sequence. For instance, input information can be encoded in the computational states or computational subspaces defined by data qubits encoded in some of all of the qubit devices. The information can be processed, for example, by applying the quantum logic control sequence to the input information. The quantum logic control sequence may be represented as quantum logic gates or other quantum logic operations. For instance, a quantum computation may be executed by a combination of single-qubit gates and two-qubit gates. In some cases, information is processed in another manner. Processing the information encoded in the qubit devices 204 produces output information that can be extracted from the qubit devices. The output information can be extracted, for example, by performing state tomography or individual readout operations.

Figure 3:
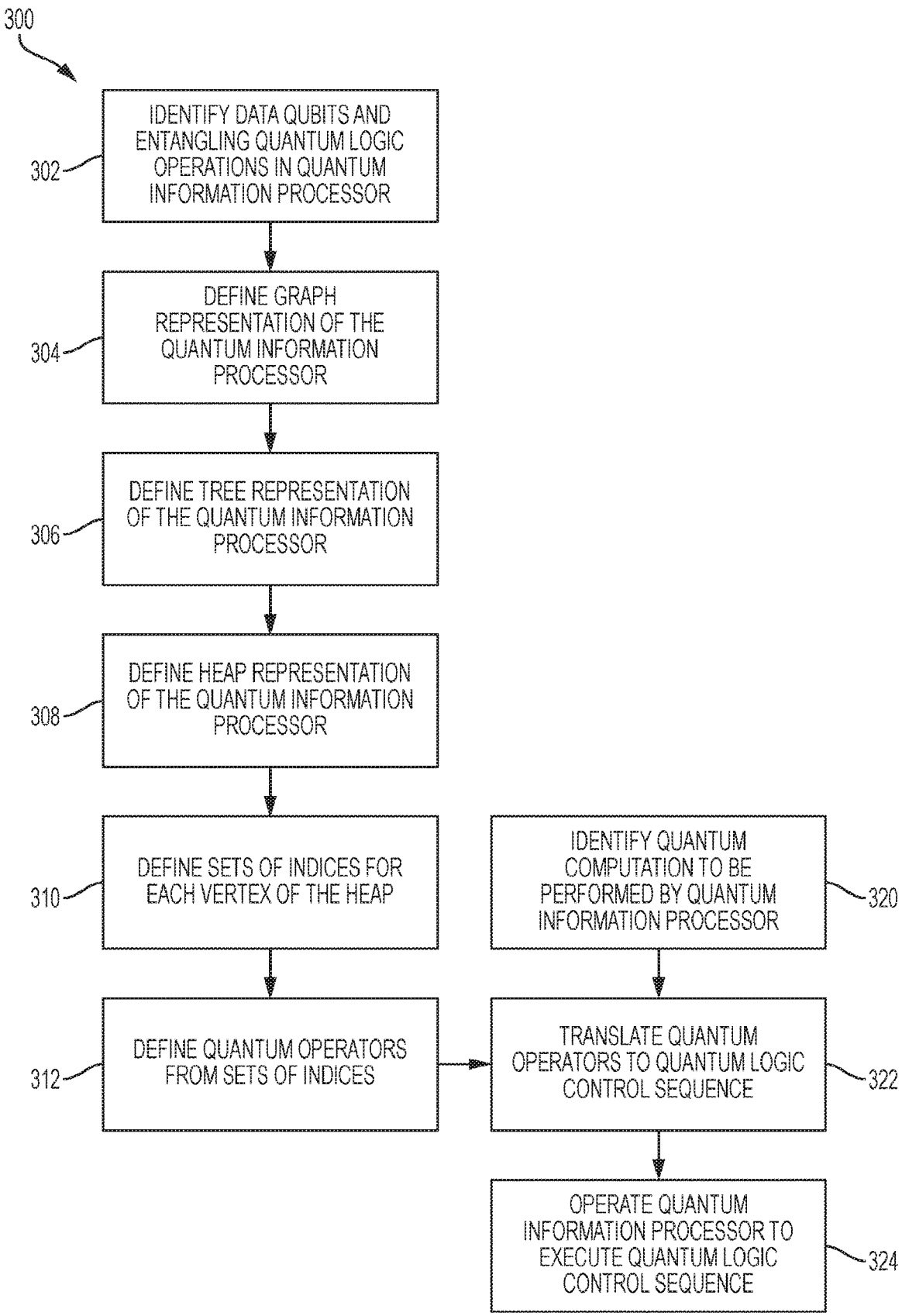
FIG. 3 is a flow chart showing an example process for generating a quantum logic control sequence.

FIG. 3 is a flow chart showing an example process 300 for generating a quantum logic control sequence. The example process 300 may include additional or different operations, and the operations may be performed in the order shown or in another order. In some cases, one or more of the operations can be performed in parallel, combined into other operations, divided into multiple operations, iterated or repeated or performed in another manner.

The example process 300 can be performed by a quantum computing system such as, for example, the example quantum computing system 100 shown in FIG. 1 or another type of quantum computing system. In some examples, a portion of the process 300 can be performed by the control system 110, and another portion of the process 300 can be performed by the quantum information processor 102 shown in FIG. 1. In some implementations, at least a portion of the process 300 is performed by a classical computing resource. For instance, a quantum logic control sequence may be generated by one or more classical processors. The process 300 may be performed by another type of system in some cases.

At 302, data qubits and entangling quantum logic operations in a quantum information processor are identified. For example, the quantum information processor can be the example quantum information processor 200 shown in FIG. 2. In the example shown in FIG. 2, identifying the data qubits may include identifying some or all of the qubit devices 204 as data qubits to be used in a quantum computation, and identifying the entangling quantum logic operations may include identifying the entangling quantum logic operations 206 that operate on pairs of the data qubits. The quantum information processor can be a gate-based quantum information processor, and the entangling quantum logic operations can be entangling gates (e.g., controlled-not gates, etc.).

In some implementations, the quantum information processor includes a superconducting circuit, and the qubits can be implemented as fluxonium devices, transmon devices or another type of device that includes one or more Josephson junctions. In some cases, the qubit devices are interconnected by electronic components or other connections in the superconducting circuit. In some implementations, the qubits can be implemented as trapped ions in an ion trap system. In some cases, the trapped ions are interconnected by optical media or connections in the ion trap system. Data qubits may be implemented and interconnected using other types of hardware.

In the example process 300, the quantum information processor is configured to apply the entangling quantum logic operations directly to certain sets of the data qubits. In some cases, the sets of data qubits (to which entangling quantum logic operations can be directly applied) can be identified based on the physical layout and connectivity of the quantum information processor. For instance, the quantum information processor may include, between neighboring pairs of the data qubits, connection hardware (e.g., a superconducting circuit device, an optical device, etc.) that can operate to apply the entangling quantum logic operation to the neighboring pair of data qubits. In some cases, the sets of data qubits (to which entangling quantum logic operations can be directly applied) can be identified in another manner, for example, based on measurement or characterization of the quantum information processor, etc.

In the example process 300, the entangling quantum logic operations identified at 302 can be applied to the data qubits directly in hardware, without routing information from other data qubits or recomposing the quantum logic for the hardware. For instance, the entangling quantum logic operations identified at 302 can be applied without having to perform swap gates with other data qubits, without having to otherwise recompose the quantum logic operation in terms of other data qubits, etc. Accordingly, the entangling quantum logic operations identified at 302 may be considered low-level resources of the quantum information processor, for example, part of the machine-level computational structure of the quantum information processor hardware.

Figure 4A:
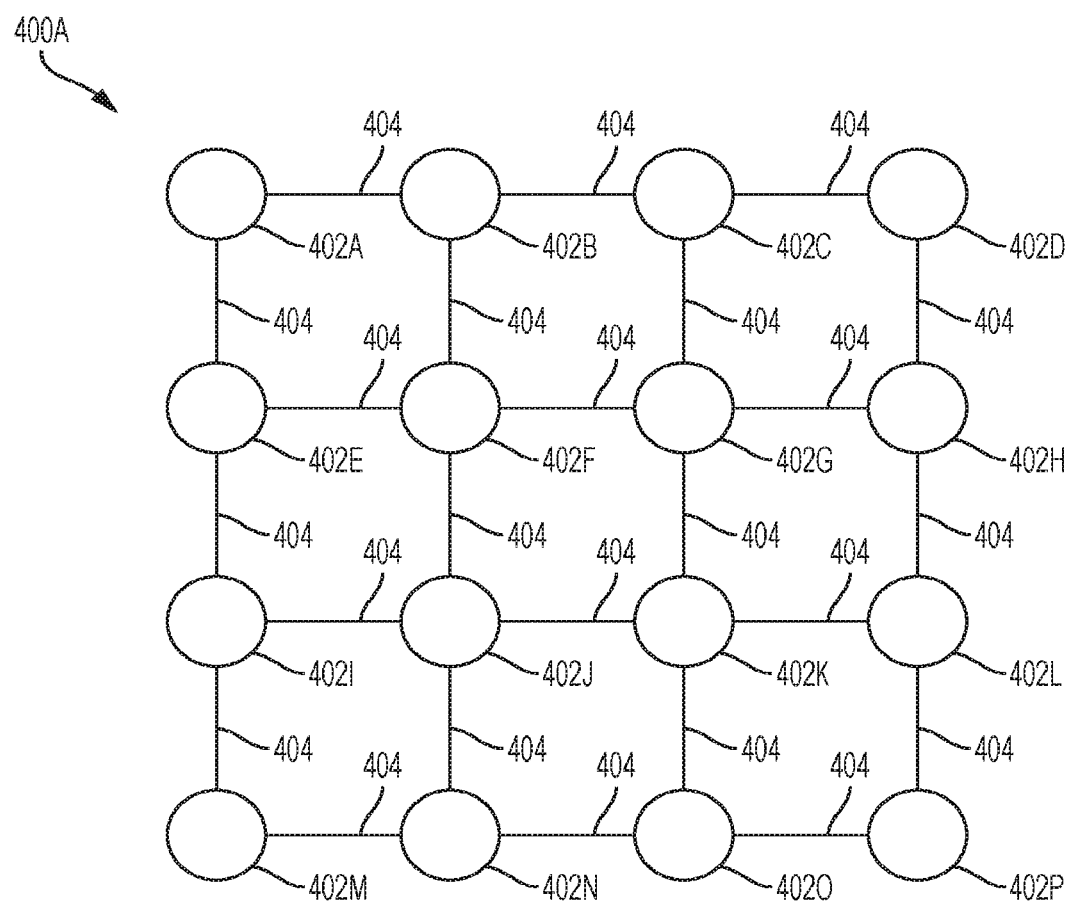
FIG. 4A is a diagram showing an example graph representation of a quantum information processor.

At 304, a graph representation of the quantum information processor is defined. The graph includes vertices and edges. The vertices in the graph represent the data qubits identified at 302; the edges in the graph represent the entangling quantum logic operations identified at 302. Accordingly, the graph defined at 304 represents hardware attributes of the quantum information processor, for example, based on data qubit connectivity in the quantum information processor. An example of a graph is shown in FIG. 4A; another type of graph representation of the quantum information processor may be defined.

The graph can include weights associated with the edges. For instance, the weights can be numerical values assigned to the edges of the graph. The weight for each edge can indicate a figure of merit for the entangling quantum logic operation represented by the edge. For example, the weight for each edge can be the measured, simulated or estimated fidelity for the entangling quantum logic operation. In some cases, a measured fidelity can be obtained by performing quantum process tomography of the entangling quantum logic operation. In some cases, a simulated fidelity can be obtained by numerically simulating the entangling quantum logic operation on a classical processor and accounting for noise processes in the numerical simulation. In some cases, another type of fidelity or other figure of merit can be used to assign the weights to the edges of the graph.

At 306, a tree representation of the quantum information processor is defined. The tree is generated from the graph defined at 304. The tree can include all the vertices of the graph and a subset of the edges of the graph. The tree is defined without loops, such that any two vertices in the tree are connected by exactly one path. The vertices in the tree represent the data qubits identified at 302, and the subset of the edges in the tree represent a subset of the entangling quantum logic operations identified at 302.

Figure 4B:
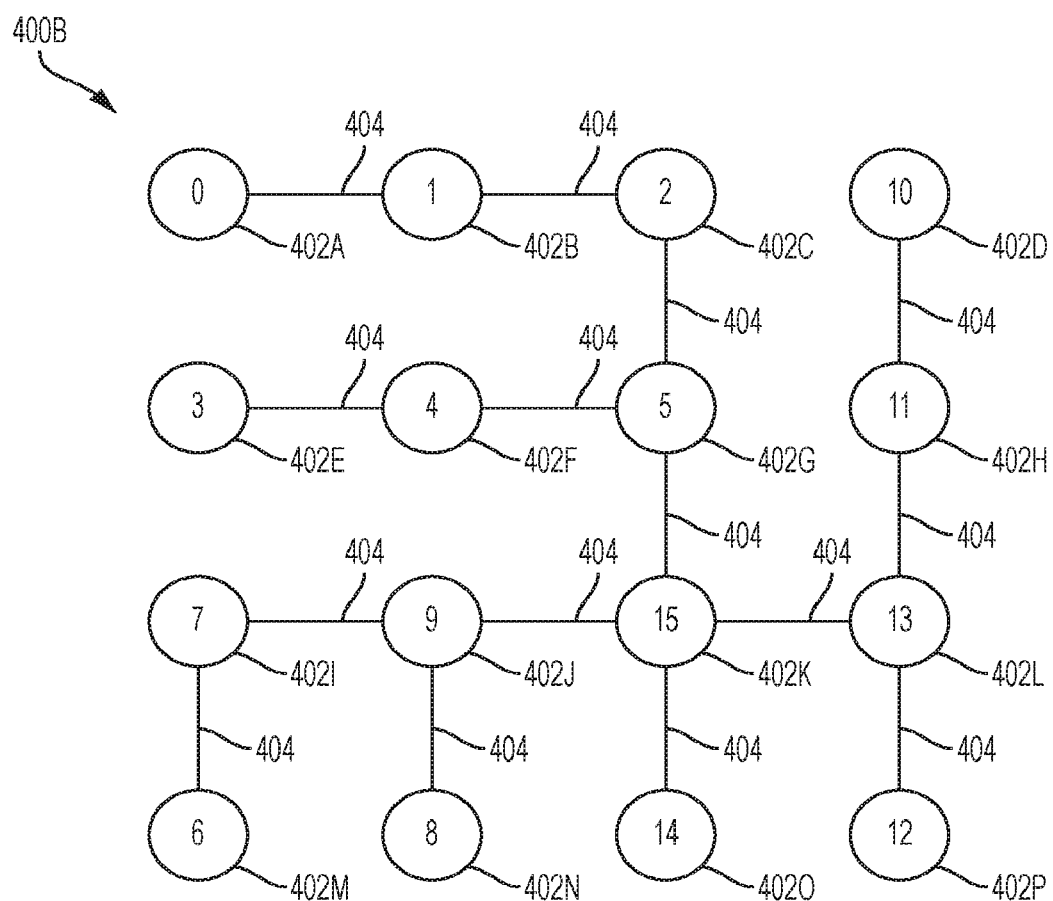
FIG. 4B is a diagram showing an example heap representation of a quantum information processor.

Defining the tree can include designating an interior vertex of the graph as a root of the tree, and defining the subset of the edges based on a breadth-first traversal of the graph from the interior vertex. In the breadth-first search, a vertex is marked and designated as the root in the tree; the root's neighboring vertices in the graph are then marked and designated as the root's children in the tree; for each of the root's children, its unmarked neighboring vertices in the graph are marked and designated as its children in the tree; and so forth until all of the vertices have been marked. In some cases, the tree can be generated by a depth-first traversal of the graph or by another type of traversal of the graph. The root of the tree may be any vertex of the graph. In some instances, the root is a vertex that minimizes the path length to the farthest other node in the graph (such a vertex may be considered a center of the graph). Generating a tree by choosing a center vertex for the root and building the tree by a breadth-first traversal can generate a minimum-depth spanning tree over the graph. A minimum-depth spanning tree can include all vertices of the graph with the minimum number of levels from the root of the tree to the leaves of the tree. An example of a tree is shown in FIG. 4B; another type of tree representation of the quantum information processor may be defined.

In some implementations, the graph defined at 304 includes weights associated with the edges, and the tree can be generated based on the weights. For instance, defining the tree can include selecting the subset of the edges based on the weights. As an example, the subset of the edges can be selected in a manner that maximizes the sum of the weights in a minimum-depth spanning tree. As another example, the subset of the edges can be selected in a manner that otherwise increases the sum of the weights in all or part of the tree.

At 308, a heap representation of the quantum information processor is defined. The heap is generated by applying indices to the vertices of the tree defined at 306. Each index can be a unique integer, and the indices can range from 0 to N−1, where N represents the number of vertices in the tree. The indices can be applied to the vertices such that each vertex's index is greater than the indices of its children. An example of a heap is shown by the indices applied to the tree in FIG. 4B; another type of heap representation of the quantum information processor may be defined.

At 310, sets of indices are defined for each vertex of the heap. In the examples discussed with respect to FIG. 4B, a flip set $F(j)$, an occupation set $O(j)$, an update set $U(j)$, a parity set $P(j)$ and a remainder set $R(j)$ are defined for each vertex. A flip set for a given vertex contains the indices for the given vertex's the immediate children. An occupation set for a given vertex contains indices for the given vertex and for the given vertex's immediate children. An update set for a given vertex contains indices for the vertices that form a path from the given vertex to the root of the tree. A parity set for a given vertex contains the symmetric set difference of all occupation sets for vertices of lower index than the given vertex. The symmetric set difference between two sets is the set of items in one set or the other, but not both. A reminder set for a given vertex contains the asymmetric set difference between the parity set and the occupation set for the given vertex. The asymmetric set difference between two sets is the set of items in the first set but not in the second. Other types of sets may be defined in some cases.

At 312, the sets of indices (from 310) are used to define quantum operators for the quantum computation. For example, the quantum computation may be expressed or decomposed in terms of one or more quantum operators defined over all or part of the Hilbert space. In some cases, the sets of indices (from 310) can be used to express composite quantum operators in terms of qubit operators applied to sets of the data qubits. For example, the quantum operators can include creation and annihilation operators expressed in terms of Pauli operators. The particular set of Pauli operators representing a creation operator or annihilation operator for a data qubit can be expressed in terms of a flip set $F(j)$, an occupation set $O(j)$, an update set $U(j)$, a parity set $P(j)$ and a remainder set $R(j)$ defined for the vertex representing the data qubit in the heap. Other types of quantum operators can be defined based on the sets of indices in some cases.

At 320, a quantum computation to be performed by the quantum information processor is identified. The quantum computation identified at 320 can be a hardware-agnostic description of a quantum process. For instance, the quantum computation may be a description of a quantum system to simulate, and may be represented, for example, as a Hamiltonian, as a list of unitary operations, as a superoperator, as a matrix, as a quantum logic circuit, or otherwise.

In some examples, the quantum computation is a simulation of a fermionic system, identified by a Hamiltonian for the fermionic system. An example of a fermionic system that may be simulated on a quantum information processor is a system of electrons. Examples of a Hamiltonian for a fermionic system include the Coulomb Hamiltonian and the Fermi-Hubbard Hamiltonian. In some instances, the Hamiltonian of a fermionic system is expressed in second-quantized form, or the Hamiltonian may be expressed in another form.

At 322, the quantum operators are translated to a quantum logic control sequence. The quantum logic control sequence is a sequence of quantum logic operations that can be executed by the quantum information processor to perform the quantum computation identified at 320. The quantum logic operations may include the entangling quantum logic operations identified at 302, and additional (e.g., non-entangling) quantum logic operations. In some cases, the quantum logic control sequence is a quantum logic circuit that includes a sequence of quantum logic gates for a gate-based quantum information processor. The quantum logic gates can include single-qubit gates or multi-qubit gates that can be executed in the quantum information processor.

At 324, the quantum logic control sequence is executed by the quantum information processor. In some cases, the quantum logic control sequence is executed by delivering appropriate control signals in the quantum information processor. For example, the qubit devices in a superconducting circuit may be configured to operate at microwave frequencies, and the quantum information processor can be controlled by microwave control signals delivered into the superconducting circuit. As another example, the qubit devices in an ion trap system may be configured to operate at optical frequencies, and the quantum information processor can be controlled by optical control signals delivered into the ion trap system. The quantum logic control sequence may be executed in another manner.

In the example process 300, executing the quantum logic control sequence at 324 causes the quantum information processor to perform the quantum computation identified at 320. For instance, data obtained from the quantum information processor during or after execution of the quantum logic control sequence may correspond to an output of the quantum computation. In some cases, the quantum logic control sequence is performed multiple times, for example, using different input states or other parameters.

In some examples, the quantum logic control sequence can be executed in the context of a larger computational paradigm. For example, the quantum logic control sequence may be executed in the context of a quantum variational eigensolver algorithm, a quantum phase estimation algorithm, a quantum approximate optimization algorithm or another type of algorithm. When the quantum logic control sequence is executed in the context of a quantum variational eigensolver algorithm, the algorithm can use an ansatz such as, for example, a Unitary Coupled Cluster or Hamiltonian ansatz.

FIG. 4A is a diagram showing an example graph 400A representation of a quantum information processor. The example graph 400A shown in FIG. 4A is based on the example quantum information processor 200 shown in FIG. 2. Another type of graph may be generated based on the quantum information processor 200 shown in FIG. 2.

Vertices in the example graph 400A represent qubit devices 204, and there is an edge where two qubit devices 204 can be entangled directly via a multi-qubit logic operation. In particular, the example graph 400A shown in FIG. 4A includes sixteen vertices and twenty-four edges. The vertices 402A, 402B, 402C, 402D, 402E, 402F, 402G, 402H, 402I, 402J, 402K, 402L, 402M, 402N, 402O, 402P (collectively, the vertices 402) represent the respective qubit devices 204 of the example quantum information processor 200, and the edges 404 represent the respective entangling quantum logic operations 206 shown in FIG. 2.

In the example shown in FIG. 4A, all the qubit devices 204 in the quantum information processor 200 are identified as data qubits that can be used to perform a quantum computation, and the graph 400A includes a vertex for each of the qubit devices 204. In some cases, only a subset of the qubit devices in a quantum information processor are identified as data qubits and represented in the graph. In the example shown in FIG. 4A, the entangling quantum logic operations 206 can be applied to all nearest-neighbor pairs of the qubit devices 204, and the graph 400A includes an edge 404 between each pair of vertices representing a nearest-neighbor pair of data qubits. In some cases, entangling quantum logic operations can be applied to a different subset of qubits in the quantum information processor, and the edges are arranged in another manner.

FIG. 4B is a diagram showing an example heap 400B representation of a quantum information processor. The example heap 400B shown in FIG. 4B includes a tree that is based on the graph 400A shown in FIG. 4A, with indices applied to the tree to form the heap 400B. The example tree includes all the vertices 402 and a subset of the edges 404 of the graph shown in FIG. 4A.

In the example shown in FIG. 4B, the edges 404 that are included in the tree are selected from the graph 400A based on a breadth-first traversal of the graph 400A. In the breadth-first traversal, the interior vertex 402K is marked and designated as the root of the tree. The vertices 402G, 402J, 402L, 402O that neighbor the vertex 402K in the graph 400A are then marked and designated as the children of vertex 402K in the tree. For each child of vertex 402K in the tree, its unmarked neighboring vertices in the graph 400A are marked and designated as children of that vertex in the tree. For example, the vertices 402H and 402P are marked and designated as children of vertex 402L; the vertices 402C and 402F are then marked and designated as children of vertex 402G; the vertices 402I and 402N are then marked and designated as children of vertex 402J. The process continues until all of the vertices have been marked. The example tree shown in FIG. 4B is an example of a minimum-depth spanning tree for the graph 400A shown in FIG. 4A. Another type of tree can be generated based on the graph 400A, and another type of process can be used to generate the tree.

In the example shown in FIG. 4B, the heap 400B is defined by applying indices to the vertices of the tree representation of the quantum information processor. The indices are integers ranging from 0 to N−1, where N represents the number of vertices. The indices are applied such that each vertex has an index greater than the indices of its children. For example, the root vertex 402K has the highest index (15); vertex 402L has an index (13) that is greater than the indices (11, 12) of its children, etc. In some cases, the indices can be applied to the tree in another manner to define a heap.

An example application of a quantum information processor is the simulation of fermions. Many important physical systems such as the electrons in atomic and molecular systems are interacting fermions, and being able to simulate and predict their behavior can have significant practical value. There exist several proposed quantum computing algorithms for simulating fermions, including the Quantum Variational Eigensolver and Quantum Phase Estimation. Algorithms configured to run on a gate-based quantum information processor can utilize a sequence of quantum gates that encodes the Hamiltonian of the system. In some implementations, the process 300 shown in FIG. 3 can be used to generate the sequence of quantum gates.

The fermionic Hamiltonian includes quantum mechanical operators that correspond to the energy observable and appears in the Schrödinger equation governing the dynamical behavior of the fermionic system. The fermionic Hamiltonian may be expressed in the form of a sum of products of creation and annihilation operators. For example, the Hamiltonian for electrons in a molecule (after the Born-Oppenheimer approximation) can be expressed as follows:

$$\hat{H} = \sum_{i,j} h_{ij} a_i^\dagger a_j + \frac{1}{2} \sum_{ijkl} h_{ijkl} a_i^\dagger a_j^\dagger a_k a_l$$

where $a_j$ represents the creation operator applied to the j-th fermion mode, $a_i^\dagger$ represents the annihilation operator applied to the i-th fermion mode, and $h_{ij}$ represents the coupling strength between the i-th and j-th fermion modes. The creation and annihilation operators obey fermionic commutation relations. A Hamiltonian expressed in this second quantization form can be mapped to a quantum logic circuit that can be performed by a quantum information processor.

One natural set of gates to express qubit Hamiltonians is given by the Pauli operators. However, Pauli operators do not obey the fermionic commutation relations, so the second-quantization Hamiltonian is converted to an equivalent Hamiltonian in terms of Pauli operators. As an example, the graph 400A can represent the quantum information processor that will run the simulation of the fermionic Hamiltonian. The edges 404 in the graph 400A can represent the qubit-qubit connectivity of the quantum information processor, and the quantum logic control sequence that can be executed on the quantum information processor to simulate the fermionic Hamiltonian can be generated from the graph 400A. For example, a minimum-depth spanning tree can be computed over the graph 400A, and the quantum logic control sequence can be generated from the tree. For instance, the heap 400B can be generated from the tree, and the heap can be used to compute the creation and annihilation operators.

To compute the creation and annihilation operators from the example heap 400B shown in FIG. 4B, the following sets of indices are identified for each vertex in the heap 400B: a flip set F(j), an occupation set O(j), an update set U(j), a parity set P(j) and a remainder set R(j). With the sets of indices computed, the creation and annihilation operators are defined as $$a_j^\dagger = \frac{1}{2}(X_{U(j)} \otimes X_j \otimes Z_{P(j)} - iX_{U(j)} \otimes Y_j \otimes Z_{R(j)})$$

$$a_j = \frac{1}{2}(X_{U(j)} \otimes X_j \otimes Z_{P(j)} + iX_{U(j)} \otimes Y_j \otimes Z_{R(j)})$$

where $L_s$ means the Pauli operator $L \in \{X, Y, Z\}$ acting on each qubit in the set S. This gives their expression in terms of standard Pauli operators X, Y and Z:

$$X = \begin{pmatrix} 0 & 1 \\ 1 & 0 \end{pmatrix};$$

$$Y = \begin{pmatrix} 0 & -i \\ i & 0 \end{pmatrix};$$

$$Z = \begin{pmatrix} 1 & 0 \\ 0 & -1 \end{pmatrix}.$$

In some examples, the flip set F(j) for the j-th vertex can be the indices of the j-th vertex's immediate children (away from the tree root). As an example, the flip set for vertex 402J (index 9) is indices 7 and 8, for vertices 402I and 402N (the vertices immediately connected away from the root of the tree). In some examples, the occupation set O(j) for the j-th vertex is F(j) with the addition of the vertex index j. As an example, the occupation set for vertex 402J (index 9) is indices 7, 8 and 9, for vertices 402I, 402N and 402J. In some examples, the update set U(j) for the j-th vertex can be the indices of the vertices in the path from the j-th vertex to the root of the tree. As an example, the update set for vertex 402J (index 9) is index 15, for the only vertex 402K on a path to the root of the tree.

In some examples, the parity set P(j) for the j-th vertex can be the indices in the symmetric set difference of O(k) for all k<j. As an example, the parity set for vertex 402J (index 9) is 5, 7 and 8, for vertices 402G, 402I and 402N. Here, the symmetric difference of the occupation sets of vertices less than 9 includes 8 and 7, but 6 is excluded since the parity of 6 is already accounted for by 7, its ancestor in the tree. The index 5 is included, but indices less than 5 are excluded because they are descendants of 5 and thus already have their parity accounted for. The rest of the nodes are excluded because they are greater than 9. In some examples, the remainder set R(j) for the j-th vertix can be P(j)–F(j). As an example, the remainder set for vertex 402J (index 9) is the parity set minus the flip set.

Figure 6A:
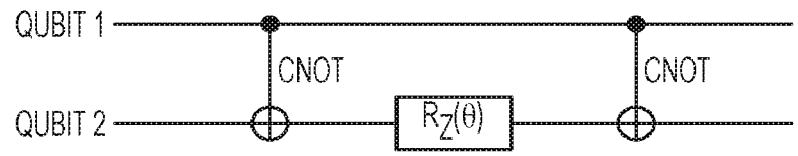
FIG. 6A is a diagram of an example quantum logic control sequence.
Figure 6B:
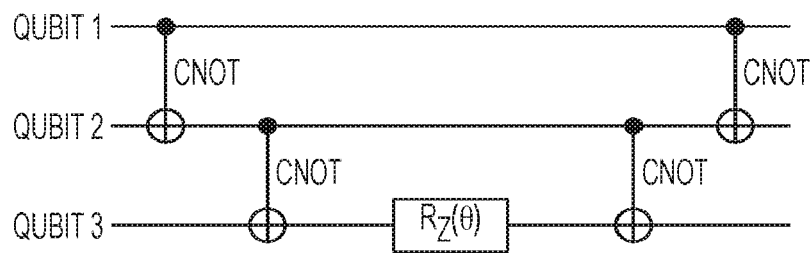
FIG. 6B is a diagram of another example quantum logic control sequence.

Once in terms of Pauli operators (e.g., as a sum over products of Pauli operators), quantum logic circuits can be synthesized, for example, using the following procedure. Each of the Pauli operators can be converted into unitary gates such that their sequential execution in the quantum information processor can be made to recover an approximation to the exponentiation of the Hamiltonian, e.g., applying Trotter expansion. In some cases, Z Pauli operators can be translated to quantum logic gates based on the examples shown in FIGS. 6A and 6B. For instance, to create a unitary gate $\exp(-i\theta Z_1 Z_2/2)$ on two qubits, where $\theta$ is the angle of rotation, the example quantum logic circuit 600A shown in FIG. 6A can be used. In the example quantum logic circuit 600A shown in FIG. 6A, a CNOT gate is applied to the two qubits, then one of the qubits is rotated about the z-axis by the angle $\theta$, and another CNOT gate is applied to the two qubits. Similarly, to create a unitary gate $\exp(-i\theta Z_1 Z_2 Z_3/2)$ on three qubits, where $\theta$ is the angle of rotation, the example quantum logic circuit 600B shown in FIG. 6B can be used. In the example quantum logic circuit 600B shown in FIG. 6B, two CNOT gates are applied, then one of the qubits is rotated about the z-axis by the angle $\theta$, and two more CNOT gates are applied. This construction can be generalized for an N-qubit system or N-fold products of Z Pauli operators. In some cases, X and Y Pauli operators can be converted to quantum logic gates based on converting the X and Y Pauli operators to the Z basis and using the translations for Z Pauli operators described above. For instance, if the products of the Pauli operators involve X or Y Pauli operators, a change of basis can be accomplished using the appropriate unitary transformation. As an example, the X Pauli operator can be converted to the Z basis using the transformation $$Z = HXH^\dagger$$

where H represents the Hadamard gate $$H = \frac{1}{\sqrt{2}}\begin{pmatrix} 1 & 1 \\ 1 & -1 \end{pmatrix}.$$

Similarly, the Y Pauli operator can be converted to the Z basis using the transformation $$Z = R_x\left(\frac{\pi}{2}\right) Y R_x\left(\frac{\pi}{2}\right)^\dagger$$

where $$R_x\left(\frac{\pi}{2}\right) = \frac{1}{\sqrt{2}}\begin{pmatrix} 1 & -i \\ -i & 1 \end{pmatrix}$$

Figure 6C:
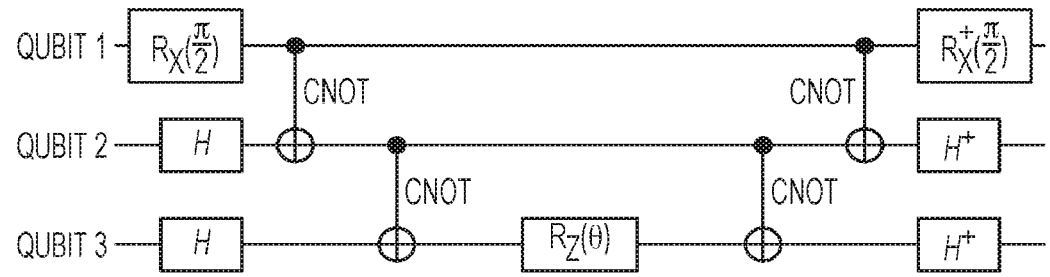
FIG. 6C is a diagram of another example quantum logic control sequence.

FIG. 6C shows an example quantum logic circuit 600C for a three-qubit unitary gate, $\exp(-i\theta Y_1 X_2 X_3/2)$ based on conversions to the Z basis.

Figure 5A:
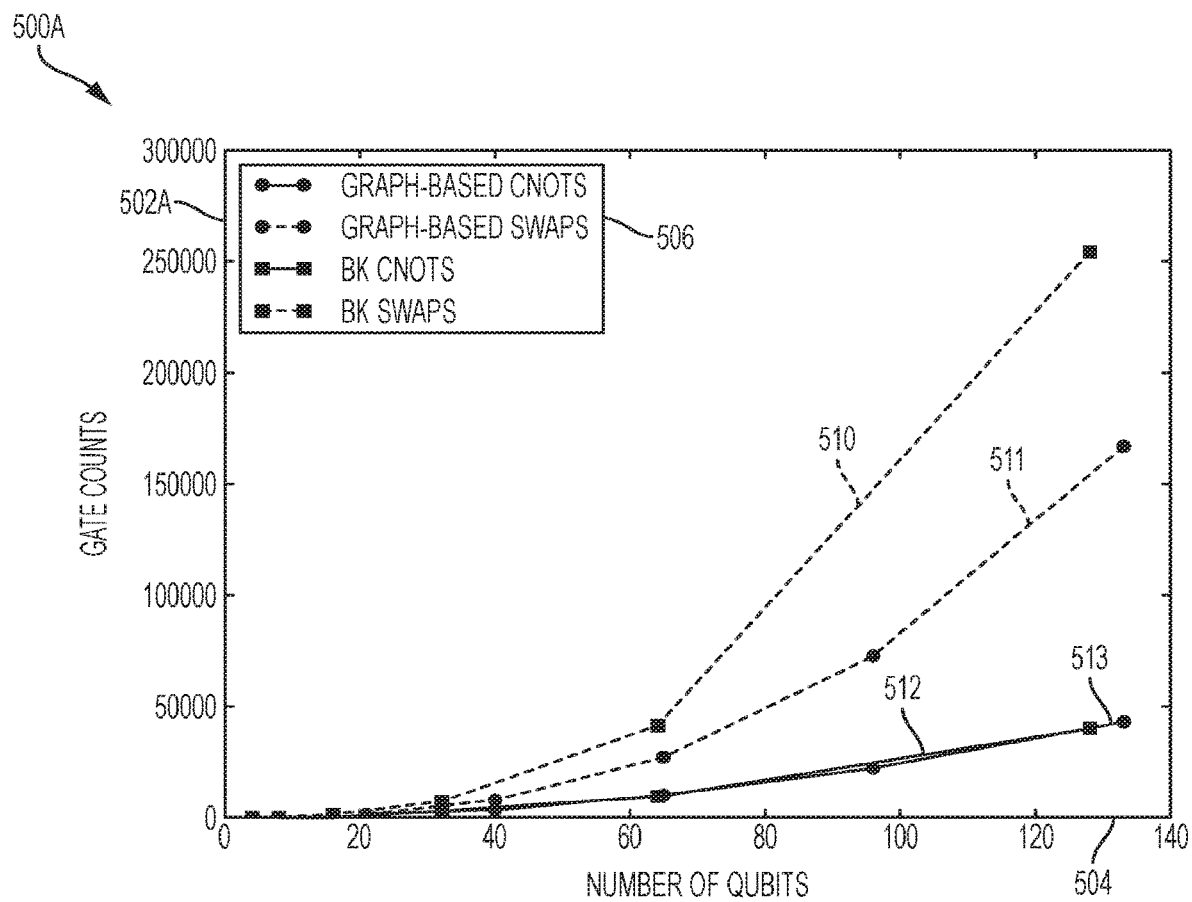
FIG. 5A is a plot showing gate counts for two example quantum logic circuits.

FIG. 5A is a plot 500A showing gate counts for example quantum logic circuits configured to simulate a "Coulomb" quantum logic operator in a fermionic Hamiltonian. The plot 500A includes a vertical axis 502A indicating a range of gate counts for each quantum logic circuit, and a horizontal axis 504 indicating a range for the number of qubits. The quantum logic circuits represented in the plot 500A are configured to simulate an arbitrarily chosen "Coulomb" quantum logic operator of the form $$h_{ijkl} a_i^\dagger a_j^\dagger a_k a_l$$

where i, j, k and l are fermion wavefunction indices, and the quantum logic circuits can be executed in a quantum information processor that includes a square lattice of nearest-neighbor coupled qubits, such as, for example, the quantum information processor 200 shown in FIG. 2.

In the plot 500A, the plotted values represent an approximation of the cost of implementing quantum logic circuit as a function of the total number of qubits in the operation. In the example quantum logic circuits represented in FIG. 5A, SWAP gates are used to bring the relevant logical qubits adjacent to one another in the quantum information processor, and the CNOT gates are used to implement the "Coulomb" quantum logic operator.

The plot 500A includes four curves 510, 511, 512, 513 representing the number of quantum logic gates in the quantum logic circuits for varying numbers of qubits. The curves 511 and 513 represent the number of SWAP gates and the number of controlled-not (CNOT) gates, respectively, in quantum logic circuits generated according to a graph-based process 300 shown in FIG. 3. For comparison, the curves 510 and 512 represent the number of SWAP gates and the number of CNOT gates, respectively, in a quantum logic circuits generated according to the so-called "Bravyi-Kitaev transformation" described in the publication entitled "The Bravyi-Kitaev transformation for quantum computation of electronic structure" by Jacob T. Seeley, Martin J. Richard and Peter J. Love (J. Chem. Phys. 137, 224109 (2012)).

As shown in FIG. 5A, the quantum logic circuits generated according to the graph-based transformation generally have fewer SWAP gates than the quantum logic circuits generated using the so-called Bravyi-Kitaev transformation. Both techniques produce approximately the same number of CNOT gates in the example shown. Accordingly, a graph-based transformation such as the process 300 shown in FIG. 3 can reduce the number of SWAP gates needed in a simulation of the "Coulomb" quantum logic operator in this example.

Figure 5B:
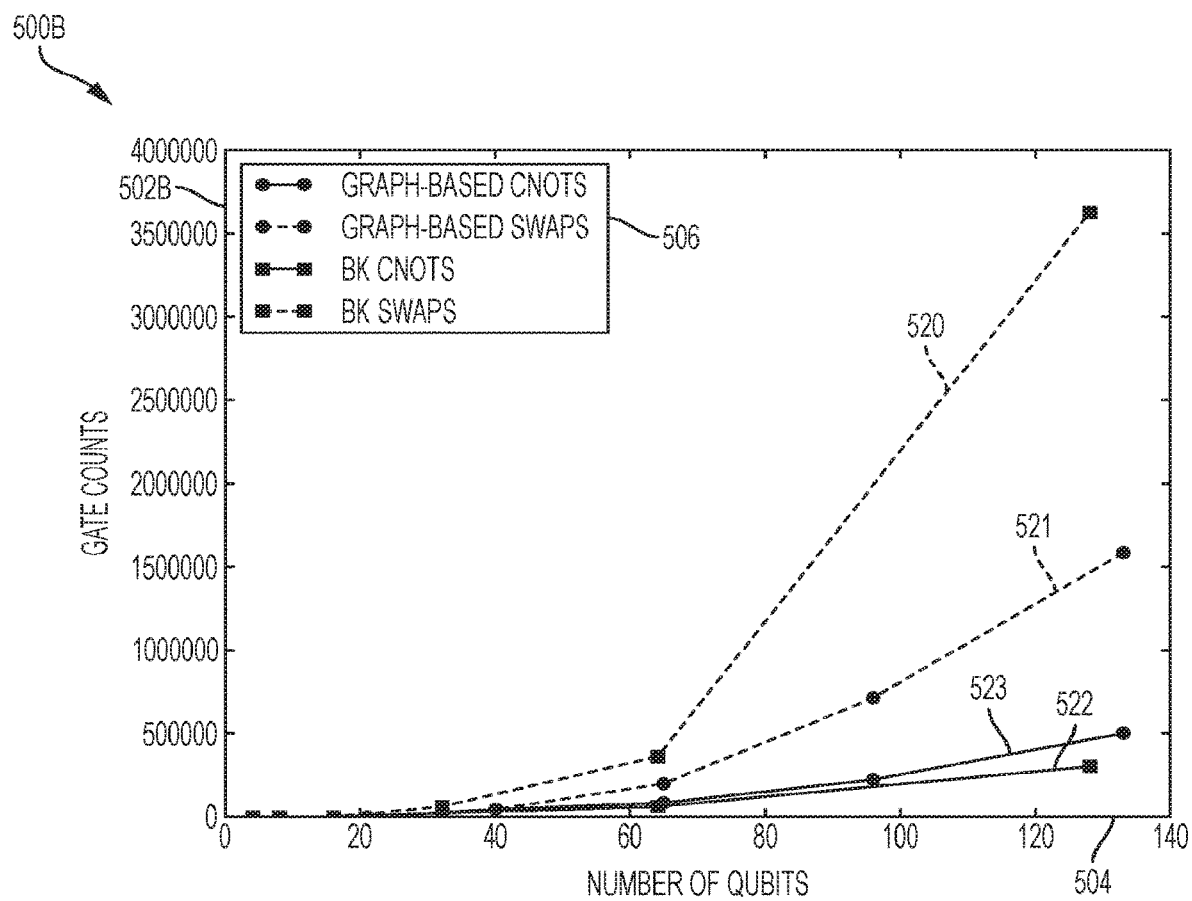
FIG. 5B is another plot showing gate counts for two example quantum logic circuits.

FIG. 5B is another plot 500B showing gate counts for example quantum logic circuits configured to simulate an "excitation" quantum logic operator in a fermionic Hamiltonian. The plot 500B includes a vertical axis 502B indicating a range of gate counts for each quantum logic circuit, and the horizontal axis 504 indicating a range for the number of qubits. The quantum logic circuits represented in the plot 500B are configured to simulate an arbitrarily chosen "excitation" quantum logic operator of the form $$h_{ij}(a_i^\dagger a_j + a_j^\dagger a_i)$$

where i and j are fermion wavefunction indices, and the quantum logic circuits can be executed in a quantum information processor that includes a square lattice of nearest-neighbor coupled qubits, such as, for example, the quantum information processor 200 shown in FIG. 2. In the example quantum logic circuits represented in FIG. 5B, SWAP gates are used to bring the relevant logical qubits adjacent to one another in the quantum information processor, and the CNOT gates are used to implement the "excitation" quantum logic operator.

The plot 500B includes four curves 520, 521, 522, 523 representing the number of quantum logic gates in the quantum logic circuits for varying numbers of qubits. The curves 521 and 523 represent the number of SWAP gates and the number of CNOT gates, respectively, in the quantum logic circuits generated according to the graph-based process 300 shown in FIG. 3. For comparison, the curves 520 and 522 represent the number of SWAP gates and the number of CNOT gates, respectively, in the quantum logic circuits generated according to the so-called "Bravyi-Kitaev transformation." As shown in FIG. 5B, the quantum logic circuits generated according to the graph-based transformation generally have fewer total gates (SWAP gates plus CNOT gates) than the quantum logic circuits generated using the so-called "Bravyi-Kitaev transformation." Accordingly, a graph-based transformation such as the process 300 shown in FIG. 3 can reduce the number of total gates needed in a simulation of the "excitation" quantum logic operator.

In some implementations, the graph-based transformation can be used to generate a quantum logic control sequence for simulating a fermionic Hamiltonian in an adiabatic quantum information processor. As an example, simulating an electronic structure Hamiltonian in an adiabatic quantum information processor may include preparing the ground state of an initial Hamiltonian and then adiabatically transforming the initial Hamiltonian to the target Hamiltonian. If the transformation is applied slowly enough, the ground state of the target Hamiltonian is produced and can then be measured.

In some implementations, direct simulation of the transformed Hamiltonian can be performed if the adiabatic quantum information processor has the appropriate entangling operations. In a quantum system with pairwise qubit interactions, the full Hamiltonian is embedded in a system with ancilla qubits and two-body interactions. This embedding may be accomplished, for example, using a perturbative gadget Hamiltonian. The design of the gadget depends on the target Hamiltonian expressed in terms of Pauli operators. The second quantization operators expressed in terms of Pauli operators can be used to compute information about the electronic structure problem instance of interest. The following paragraphs describe two example techniques where energy is computed, but another observable may be computed in some cases.

A first example technique known as "phase estimation" may proceed as follows. First, convert the Hamiltonian, expressed in second-quantization operators in terms of Pauli operators by substituting in the values obtained from the transformation, then use algebraic rules of quantum operators (e.g. complex valued matrices) to simplify. The result is a sum of terms, each term with a complex coefficient and a product of Pauli operators acting on different qubits. Next, convert each term in the sum to a sequence of quantum logic operations. The conversion may be performed, for example, by the following steps: apply a first set of single-qubit operators to rotate into the correct basis, where the Pauli operator acting on each qubit determines the single-qubit rotation on that qubit; apply a first sequence of entangling operations (e.g., CNOTs), where each qubit in the term is subsequently entangled; apply a controlled-rotation proportional to the complex coefficient on the term (the control qubit is the ancilla qubit noted below); apply a second sequence of entangling operations that reverses the first sequence of entangling operations; apply a second set of single-qubit operators that reverses the first set of single-qubit operators. Next, prepare the initial state corresponding to the lowest energy state in a Hartree-Fock computation, and prepare the ancilla qubit in the state $(|0\rangle+|1\rangle)/\sqrt{2}$. Then, apply the sequence of quantum logic operations using the ancilla qubit as the control qubit for the controlled-rotations. In some cases, when the quantum logic operations do not commute, additional accuracy may be obtained by iterating the conversion to quantum logic operations. For example, the rotations may be multiplied by the inverse of the number of iterations (2 iterations is ½, etc.) using the so-called "Trotter approximation." The phase accumulated in the ancilla qubit, which is proportional to the ground state energy, can then be measured.

A second example technique known as the "variational quantum eigensolver" or "quantum variational eigensolver" may proceed as follows. Convert the fermionic Hamiltonian to a sum of Pauli terms as in the phase estimation method. Convert the Pauli terms to a sequence of quantum logic operations. The conversion may be performed as in the phase estimation technique described above, but the angle of each rotation is determined by a variational technique instead of being a quantum controlled rotation. For example, the following steps may be performed iteratively, where the rotation angles are varied to minimize the energy observable. The rotation angles are chosen classically by a minimization technique, such as, for example, gradient descent, Nelder-Mead, etc. The Hartree-Fock initial state is prepared; the gate sequences produced with the chosen rotation amounts are applied; and the energy observable value is measured by iterating over terms, performing the qubit measurements and adding up the sum on a classical computer. Multiple iterations may be used to obtain a high-precision value of the energy expectation value.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect, a quantum logic control sequence is generated based on the attributes of a quantum information processor.

In a first example, a quantum computation to be performed by a quantum information processor is identified. The quantum information processor includes data qubits and is configured to apply entangling quantum logic operations to respective pairs of the data qubits. A graph representing the quantum information processor is defined. The graph includes vertices and edges; the vertices represent the data qubits, and the edges represent the entangling quantum logic operations. A quantum logic control sequence is generated based on the graph. The quantum logic control sequence includes a sequence of quantum logic operations configured to perform the quantum computation when executed by the quantum information processor.

In a second example, a system includes a data processing apparatus a computer-readable medium storing instructions that are operable when executed by the data processing apparatus to perform one or more of the operations of the first example.

In a third example, a system includes a quantum information processor and a computer system. The quantum information processor includes data qubits and is configured to apply entangling quantum logic operations to respective pairs of the data qubits. The computer system includes one or more processors configured to perform one or more of the operations of the first example.

Implementations of the first, second or third example may include one or more of the following features. The graph can include weights associated with the edges. The weight for each edge can indicate a figure of merit for the entangling quantum logic operation represented by the edge.

Implementations of the first, second or third example may include one or more of the following features. A tree can be defined based on the graph. The tree can include the vertices and a subset of the edges; the subset of the edges represents a subset of the entangling quantum logic operations. The graph can include weights associated with the edges. Defining the tree can include selecting the subset of the edges based on the weights. Defining the tree can include designating an interior vertex of the graph as a root of the tree; and defining the subset of the edges based on a breadth-first traversal of the graph from the interior vertex. The tree can be a minimum-depth spanning tree over the graph. Quantum operators can be defined based on the tree, and the quantum operators can be translated to generate the sequence of quantum logic operations.

Implementations of the first, second or third example may include one or more of the following features. A tree can be defined based on the graph. The tree can include the vertices and a subset of the edges; the subset of the edges represents a subset of the entangling quantum logic operations. A heap can be defined by applying indices to the vertices of the tree; and the quantum logic control sequence can be generated based on the heap. Sets of indices can be defined for each vertex of the heap. Quantum operators can be defined based on the sets of indices; and the quantum operators can be translated to generate the sequence of quantum logic operations. The quantum operators can include creation and annihilation operators expressed as Pauli operators. The set of indices for each given vertex can include one or more of the following sets: a flip set, containing indices for the immediate children of the given vertex; an occupation set, containing indices for the immediate children of the given vertex and the index of the given vertex; an update set, containing indices for vertices that form a path from the given vertex to the root of the tree; a parity set, containing the symmetric set difference of all occupation sets for vertices of lower index than the given vertex; and a reminder set, containing the asymmetric set difference between the parity set and the occupation set for the given vertex.

Implementations of the first, second or third example may include one or more of the following features. The quantum information processor can include a superconducting circuit. The quantum information processor can be a gate-based quantum information processor, the entangling quantum logic operations can be entangling gates and the quantum logic control sequence can be a quantum logic circuit that includes a sequence of quantum logic gates. The quantum computation can include a simulation of a Fermionic system, and identified by a Hamiltonian for the Fermionic system. The quantum logic control sequence can be executed on the quantum information processor.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of generating a quantum logic control sequence for execution by a quantum information processor, the method comprising:
    identifying a quantum computation to be performed by a quantum information processor, the quantum information processor comprising data qubits and configured to apply entangling quantum logic operations to respective pairs of the data qubits;
    defining a graph representing the quantum information processor, the graph comprising vertices and edges, the vertices representing the data qubits, the edges representing the entangling quantum logic operations; and
    generating a quantum logic control sequence based on the graph, the quantum logic control sequence comprising a sequence of quantum logic operations configured to perform the quantum computation when executed by the quantum information processor.

2. The method of claim 1, wherein the graph comprises weights associated with the edges, the weight for each edge being a measured, simulated or estimated fidelity for the entangling quantum logic operation represented by the edge.

3. The method of claim 2, wherein the measured fidelity is obtained by performing quantum process tomography of the entangling quantum logic operation.

4. The method of claim 2, wherein the simulated fidelity is obtained by numerically simulating the entangling quantum logic operation on a classical processor.

5. The method of claim 4, wherein numerically simulating the entangling quantum logic operation accounts for noise processes.

6. The method of claim 1, wherein the quantum information processor comprises a superconducting circuit.

7. The method of claim 1, wherein the quantum information processor comprises a gate-based quantum information processor, the entangling quantum logic operations comprise entangling gates and the quantum logic control sequence comprises a quantum logic circuit comprising a sequence of quantum logic gates.

8. The method of claim 1, wherein the quantum computation comprises a simulation of a Fermionic system, and identifying the quantum computation comprises identifying a Hamiltonian for the Fermionic system.

9. The method of claim 1, comprising executing the quantum logic control sequence on the quantum information processor.

10. The method of claim 1, wherein generating the quantum logic control sequence comprises recovering an approximation of an exponentiation of a Hamiltonian.

11. The method of claim 10, wherein the exponentiation of the Hamiltonian is an application of a Trotter expansion.

12. The method of claim 10, wherein generating the quantum logic control sequence comprises using a Trotter approximation.

13. A system comprising:
    a data processing apparatus; and
    a computer-readable medium storing instructions that are operable when executed by the data processing apparatus to perform operations comprising:
        identifying a quantum computation to be performed by a quantum information processor, the quantum information processor comprising data qubits and configured to apply entangling quantum logic operations to respective pairs of the data qubits;
        defining a graph representing the quantum information processor, the graph comprising vertices and edges, the vertices representing the data qubits, the edges representing the entangling quantum logic operations; and
        generating a quantum logic control sequence based on the graph, the quantum logic control sequence comprising a sequence of quantum logic operations configured to perform the quantum computation when executed by the quantum information processor.

14. The system of claim 13, wherein the graph comprises weights associated with the edges, the weight for each edge being a measured, simulated or estimated fidelity for the entangling quantum logic operation represented by the edge.

15. The system of claim 14, wherein the measured fidelity is obtained by performing quantum process tomography of the entangling quantum logic operation.

16. The system of claim 14, wherein the simulated fidelity is obtained by numerically simulating the entangling quantum logic operation on a classical processor.

17. The system of claim 16, wherein numerically simulating the entangling quantum logic operation accounts for noise processes.

18. The system of claim 13, wherein the quantum information processor comprises a gate-based quantum information processor, the entangling quantum logic operations comprise entangling gates and the quantum logic control sequence comprises a quantum logic circuit comprising a sequence of quantum logic gates.

19. The system of claim 13, wherein generating the quantum logic control sequence comprises recovering an approximation of an exponentiation of a Hamiltonian.

20. The system of claim 19, wherein the exponentiation of the Hamiltonian is an application of a Trotter expansion.

21. The system of claim 19, wherein generating the quantum logic control sequence comprises using a Trotter approximation.

22. A system comprising:
    a quantum information processor comprising qubit devices and configured to apply entangling quantum logic operations to respective pairs of the qubit devices;
    a computer system comprising one or more processors configured to perform operations comprising:
        identifying a quantum computation to be performed by the quantum information processor;
        defining a graph representing the quantum information processor, the graph comprising vertices and edges, the vertices representing the qubit devices, the edges representing the entangling quantum logic operations; and generating a quantum logic control sequence based on the graph, the quantum logic control sequence comprising a sequence of quantum logic operations configured to perform the quantum computation when executed by the quantum information processor.

23. The system of claim 22, wherein the graph comprises weights associated with the edges, the weight for each edge being a measured, simulated or estimated fidelity for the entangling quantum logic operation represented by the edge.

24. The system of claim 23, wherein the measured fidelity is obtained by performing quantum process tomography of the entangling quantum logic operation.

25. The system of claim 23, wherein the simulated fidelity is obtained by numerically simulating the entangling quantum logic operation on a classical processor.

26. The system of claim 25, wherein numerically simulating the entangling quantum logic operation accounts for noise processes.

27. The system of claim 22, wherein the quantum information processor comprises a superconducting circuit.

28. The system of claim 22, wherein the quantum information processor comprises a gate-based quantum information processor, the entangling quantum logic operations comprise entangling gates and the quantum logic control sequence comprises a quantum logic circuit comprising a sequence of quantum logic gates.

29. The system of claim 22, further comprising a control system configured to:

receive the quantum logic control sequence from the computer system;

generate control signals configured to cause the quantum information processor to execute the quantum logic control sequence; and output the control signals for delivery to the quantum information processor.

30. The system of claim 29, further comprising a signal delivery system configured to transfer the control signals from the control system to the quantum information processor.

31. The system of claim 22, wherein generating the quantum logic control sequence comprises recovering an approximation of an exponentiation of a Hamiltonian.

32. The system of claim 31, wherein the exponentiation of the Hamiltonian is an application of a Trotter expansion.

33. The system of claim 31, wherein generating the quantum logic control sequence comprises using a Trotter approximation.

* * * * *

UNITED STATES PATENT AND TRADEMARK OFFICE
CERTIFICATE OF CORRECTION

PATENT NO. : 10,733,522 B2
APPLICATION NO. : 16/375990
DATED : August 4, 2020
INVENTOR(S) : Curtis et al.

Page 1 of 1

It is certified that error appears in the above-identified patent and that said Letters Patent is hereby corrected as shown below:

Column 12, Line 36, delete "vertix" and insert -- vertex -- therefor.

Column 13, Line 37, delete "$h_{ijkl}a_i^\dagger a_j^\dagger a_k a_i$" and insert -- $h_{ijkl}a_i^\dagger a_j^\dagger a_k a_l$ -- therefor.

Column 14, Line 18, delete "$h_{ij}(a_i^\dagger a_j + a_j^\dagger a_i)$" and insert -- $h_{ij}\left(a_i^\dagger a_j + a_j^\dagger a_i\right)$ -- therefor.

Column 15, Line 29, delete "$(|0\rangle + |1\rangle)/\sqrt{2}$." and insert -- $(|0\rangle + |1\rangle)/\sqrt{2}.$ -- therefor.

Signed and Sealed this
Thirteenth Day of October, 2020

Andrei Iancu
*Director of the United States Patent and Trademark Office*